United States Patent
Robertson

(10) Patent No.: US 11,005,332 B2
(45) Date of Patent: May 11, 2021

(54) HYBRID TRANSMISSION HIGH VOLTAGE CONNECTION

(71) Applicant: Ford Global Technologies, LLC, Dearborn, MI (US)

(72) Inventor: Eric G. Robertson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 548 days.

(21) Appl. No.: 15/996,798

(22) Filed: Jun. 4, 2018

(65) Prior Publication Data

US 2019/0372422 A1 Dec. 5, 2019

(51) Int. Cl.
| | |
|---|---|
| *H02K 5/22* | (2006.01) |
| *B60K 6/405* | (2007.10) |
| *B60K 6/365* | (2007.10) |
| *B60K 6/26* | (2007.10) |
| *H02K 11/33* | (2016.01) |
| *H02K 7/116* | (2006.01) |
| *H02K 15/14* | (2006.01) |
| *H01R 4/38* | (2006.01) |

(52) U.S. Cl.
CPC ............... *H02K 5/225* (2013.01); *B60K 6/26* (2013.01); *B60K 6/365* (2013.01); *B60K 6/405* (2013.01); *H01R 4/38* (2013.01); *H02K 7/116* (2013.01); *H02K 11/33* (2016.01); *H02K 15/14* (2013.01); *F16H 2200/2005* (2013.01)

(58) Field of Classification Search
None
See application file for complete search history.

(56) References Cited

U.S. PATENT DOCUMENTS

| | | | |
|---|---|---|---|
| 8,939,795 B2 | 1/2015 | Tsuchiya et al. | |
| 9,365,118 B2 | 6/2016 | Deneszczuk et al. | |
| 10,819,181 B2* | 10/2020 | Hochstetler | H01R 9/24 |
| 10,833,552 B2* | 11/2020 | Major | H02K 11/33 |

* cited by examiner

*Primary Examiner* — Dirk Wright
(74) *Attorney, Agent, or Firm* — David B Kelley; Brooks Kushman PC

(57) ABSTRACT

In an electrified transmission, motor leads are electrically connected to inverter leads by being squeezed between a compressible limiter on a terminal base and a prong of a cover plate. Several such connection are accomplished by installation of the cover to an inverter housing. This method reduces the number of assembly steps and is more robust to variations in the positions of the leads. The terminal base may be part of an inverter module within the inverter housing.

14 Claims, 6 Drawing Sheets

HYBRID TRANSMISSION HIGH VOLTAGE CONNECTION

TECHNICAL FIELD

This disclosure relates to the field of electrified vehicle transmissions. More particularly, the disclosure pertains to a system and method for making electrical connections between an inverter and an electric machine.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY OF THE DISCLOSURE

An electrified transmission includes a terminal base, first and second electrical leads, and a cover. The terminal base is fixed to a housing. The first electrical lead has a first terminal plate. The second electrical lead has a second terminal plate. The cover has a first prong. The cover is bolted to the housing such that the first and second terminal plates are squeezed between the first prong and the terminal base to establish an electrical connection between the first and second leads. The electrified transmission may also include third, fourth, fifth, and sixth leads having third, fourth, fifth, and sixth terminal plates, respectively. The third and fourth terminal plates are squeezed between a second prong of the cover and the terminal base. The fifth and sixth terminal plates are squeezed between a third prong of the cover and the terminal base. The terminal base may include three compressible limiters configured to maintain squeeze forces on the terminal plates in the presence of slight variations in location of the terminal block with respect to the housing. The electrified transmission may also include an inverter configured to supply alternating current electrical power to the first, third, and fifth leads, and an electric motor configured to generate torque in response to electrical power from the second, fourth, and sixth leads. The terminal base and the inverter may be integrated into an inverter module. The electrified transmission may also include a simple planetary gear set having a sun gear fixedly coupled to the electric motor, a ring gear drivably connected to a transmission output, and a carrier fixedly coupled to a transmission input. The electric motor may be drivably connected to a transmission output.

A method of assembling a transmission includes securing a motor to a transmission housing, securing an inverter housing to the transmission housing, and securing a cover to the inverter housing. The motor is secured to the transmission housing such that three power leads protrude beyond the transmission housing. The inverter housing contains an inverter module having three inverter leads and a terminal base. The cover is secured to the inverter housing such that respective pairs of the inverter leads and power leads are squeezed between the cover and the terminal base. The terminal base may include three compressible limiters aligned with the pairs of leads. The cover may define three non-conductive prongs aligned with the compressible limiters and the pairs of leads. A seal may be installed between the inverter housing and the cover before attaching the cover to the inverter housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
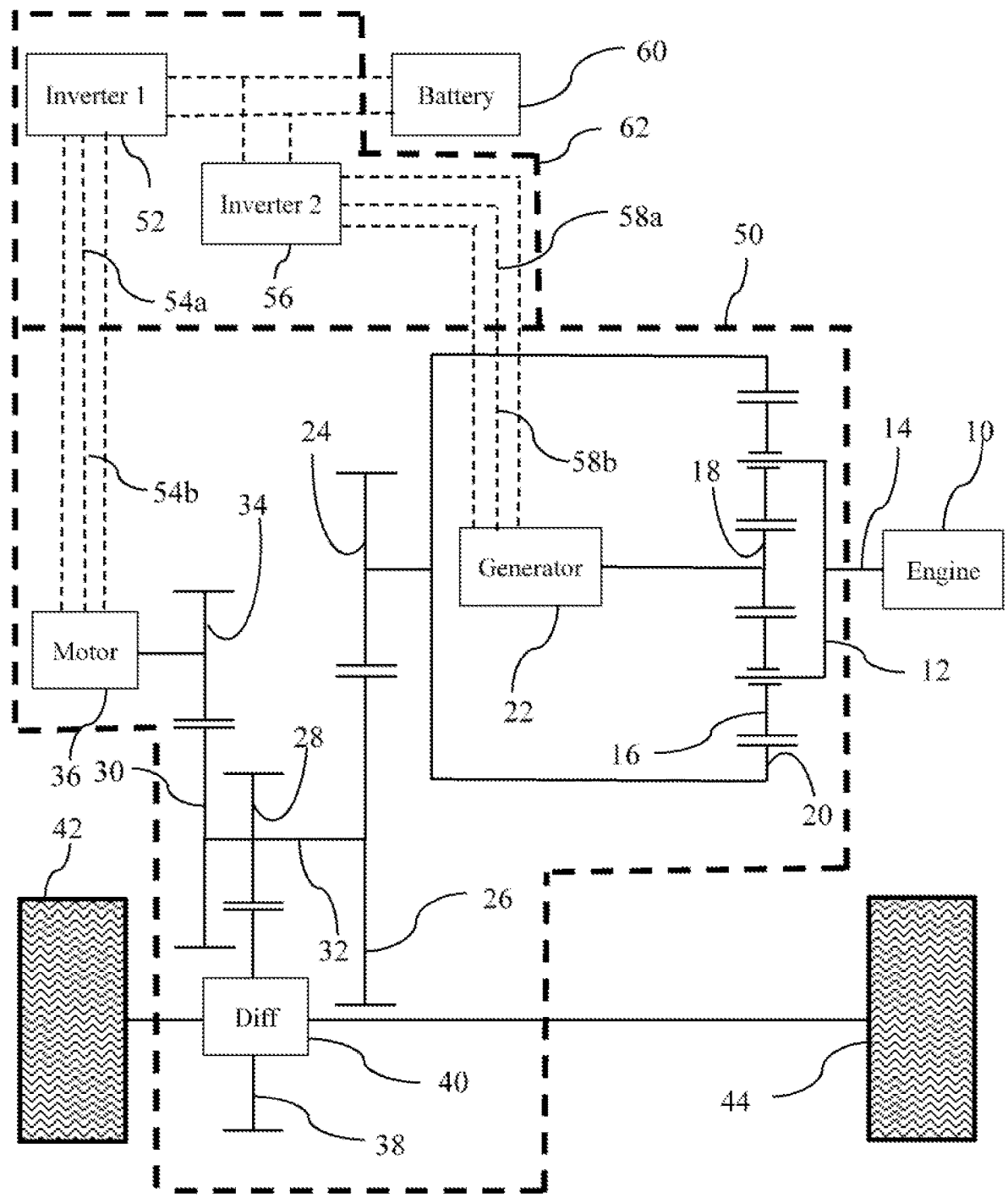
FIG. 1 is a schematic diagram of a hybrid electric powertrain.

FIG. 1 schematically illustrates a power-split type hybrid electric vehicle powertrain. Primary power is provided by engine 10 which is fixedly coupled to planet carrier 12 via transmission input shaft 14. A set of planet gears 16 are supported for rotation with respect to carrier 12. Sun gear 18 and ring gear 20 are each supported for rotation about the same axis as carrier 12 and each mesh with the planet gears 16. Generator 22 is fixedly coupled to sun gear 18. Layshaft gear 24 is fixedly coupled to ring gear 20 and meshes with layshaft gear 26. Layshaft gear 26 is fixedly coupled to layshaft gears 28 and 30 via shaft 32. Layshaft gear 34 meshes with layshaft gear 30 and is fixedly couple to motor 36. Layshaft gear 28 meshes with layshaft gear 38 which is the input to differential 40. Differential 40 drives wheels 42 and 44 allowing slight speed differences as the vehicle turns a corner.

Generator 22 and motor 36 are both reversible electric machines. The terms generator and motor are used merely as labels. Both machines are capable of converting electrical power to mechanical power or converting mechanical power to electrical power. For example, each machine may be a synchronous motor.

The two electric machines and the transmission gearing are contained within transmission housing 50. Motor 36 is powered by a first inverter 52 via three leads 54. The portion of the leads located outside of the transmission housing 50 are labelled 54a whereas the portion of the leads located within the housing 50 are labelled 54b. Similarly, Generator 22 is powered by a second inverter 56 via three leads 58. The portion of these leads located outside of the transmission housing 50 are labelled 58a whereas the portion located within the housing 50 are labelled 58b. The portions located outside the housing may be called inverter leads and the portion inside the housing may be called motor leads. The leads may be electrical wire or other types of conductive material such as rigid sheet metal. At least the ends of the leads that get connected to one another are flat blades. Both inverters are electrically connected to battery 60 by a direct current bus. Inverters 52 and 56 are contained within inverter housing 62 which is attached to transmission housing 50.

In some circumstances, engine 10 may generate more power than is delivered to the vehicle wheels 42 and 44 with the excess power stored in battery 60. In other circumstances, power may flow from battery 60 permitting engine 10 to produce less power than the instantaneous demand of the vehicle. For example, the engine 10 may be off while power to propel the vehicles comes from battery 60.

The powertrain of FIG. 1 can be operated in a continuously variable mode with battery 60 neither providing nor absorbing power. The torque applied to generator 22 and the torque applied to layshaft gear 24 are both related to the torque generated by engine 10 based on the number of teeth on sun gear 18 and the number of teeth on ring gear 20. Specifically, $$T_{gen} = \frac{N_{sun}}{N_{sun} + N_{ring}} T_{eng}$$

$$T_{gear24} = \frac{N_{ring}}{N_{sun} + N_{ring}} T_{eng}$$

where $T_{eng}$ is the torque generated by engine 10, $T_{gen}$ is the torque absorbed by the generator 22, $T_{gear24}$ is the torque absorbed by gear 24, $N_{sun}$ is the number of teeth on sun gear 18, and $N_{ring}$ is the number of teeth on ring gear 20. The engine speed is a weighted average of the generator speed and the speed of gear 24.

$$\omega_{eng} = \frac{N_{sun}}{N_{sun} + N_{ring}} \omega_{gen} + \frac{N_{ring}}{N_{sun} + N_{ring}} \omega_{gear24}$$

When the vehicle is moving slowly, gear 24 rotates slowly and generator 22 rotates faster than engine 10. Power generated by the engine is split by the planetary gear set. A portion of the power is transmitted mechanically to shaft 32 from carrier 14 to ring gear 20 to gear 24 to gear 26. The remaining power is transmitted from sun 18 to generator 22 which converts the power to electrical power. Motor 36 converts the electrical power to mechanical power which is transmitted to shaft 32 by gear 34 and 30.

Figure 2:
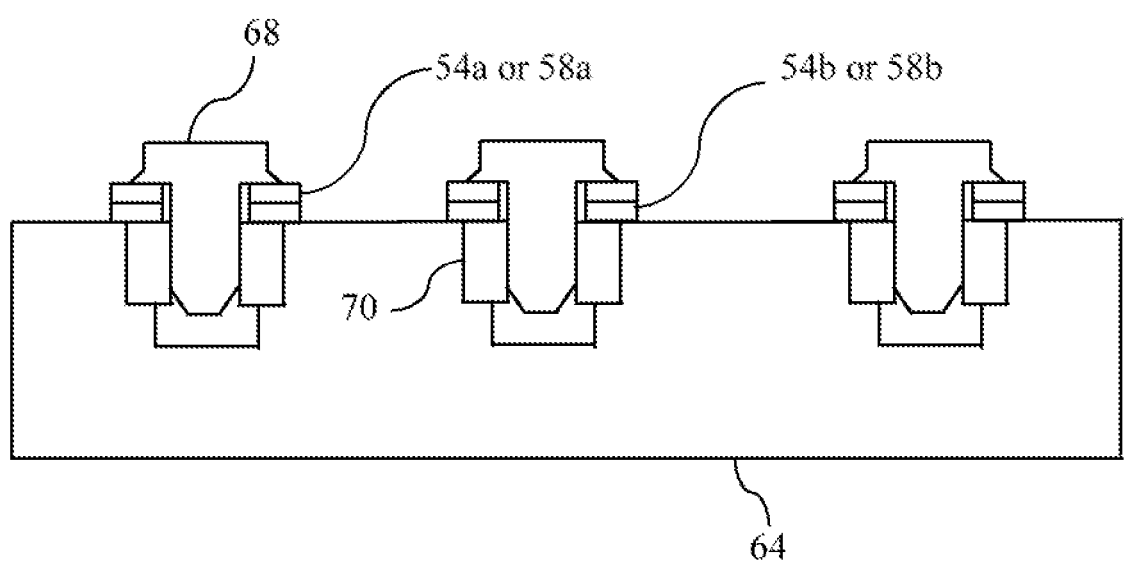
FIG. 2 is a cross sectional view of a terminal block joining three inverter cables to three respective motor cables using a bolt threaded into a retained nut.

FIG. 2 shows a first three phase power connection subsystem. A terminal base 64 is supported within the inverter housing 62. For example, a portion of an inverter module may function as the terminal base. (To avoid drawing clutter, only one of the three inverter leads and one of the three power leads is labelled in FIG. 2.) Each inverter leads is squeezed to one of the power leads by a terminal bolt 68 threaded into a corresponding terminal nut 70. When the leads are squeezed tightly together, electricity can flow freely between leads 54a and 54b. Each of the terminal nuts is retained in the terminal base 64. Leads 58a and 58b are connected similarly. After all connections are established, a cover (not shown) may be bolted to the housing to reduce exposure to contamination and to prevent accidental contact with the leads while they are carrying high voltage electrical power.

Figure 3:
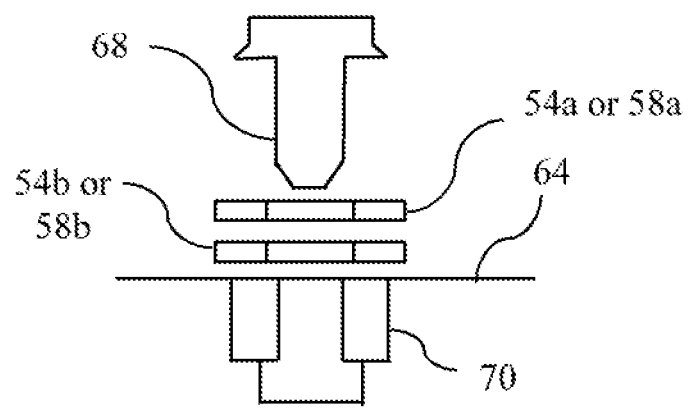
FIG. 3 is a detail exploded view indicating the nominal positions of parts before installation of one of the bolts in the terminal block of FIG. 2.

FIG. 3 shows one of the sets of parts prior to installation of the terminal bolt 68 when each part is located in its nominal intended position for this stage of assembly. Due to the way the remainder of the leads are retained, the ends of the leads may be moved vertically with moderate force without displacing or stressing other components. Therefore, with the ends of the leads positioned directly over the terminal nut 70, the terminal bolt can be inserted and tightened without difficulty.

Figure 4:
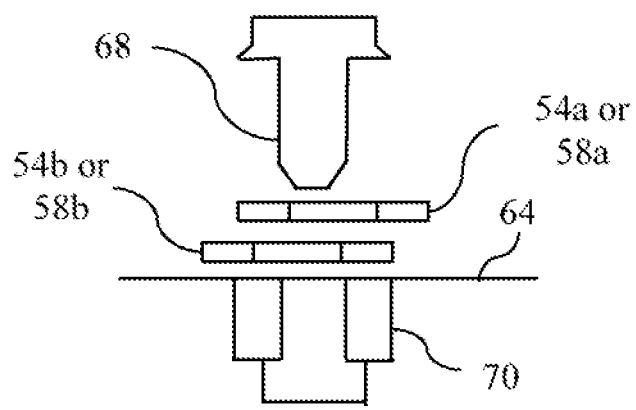
FIG. 4 is a detail exploded view indicating common positions of parts before installation of one of the bolts in the terminal block of FIG. 2.

Unfortunately, due to part-to-part variation and other noise factors, the ends of the leads may sometimes not align with the terminal nut as shown in FIG. 4. Inserting the terminal bolt in this circumstance requires displacing the leads horizontally. Moving the ends of the leads horizontally requires substantially higher forces, may result in other components also moving, and may result in stress in other parts. The side forces substantially increase the risk of the terminal bolt being installed cross-threaded in the terminal nut, which in turn increased the risk of a poor electrical connection.

Figure 5:
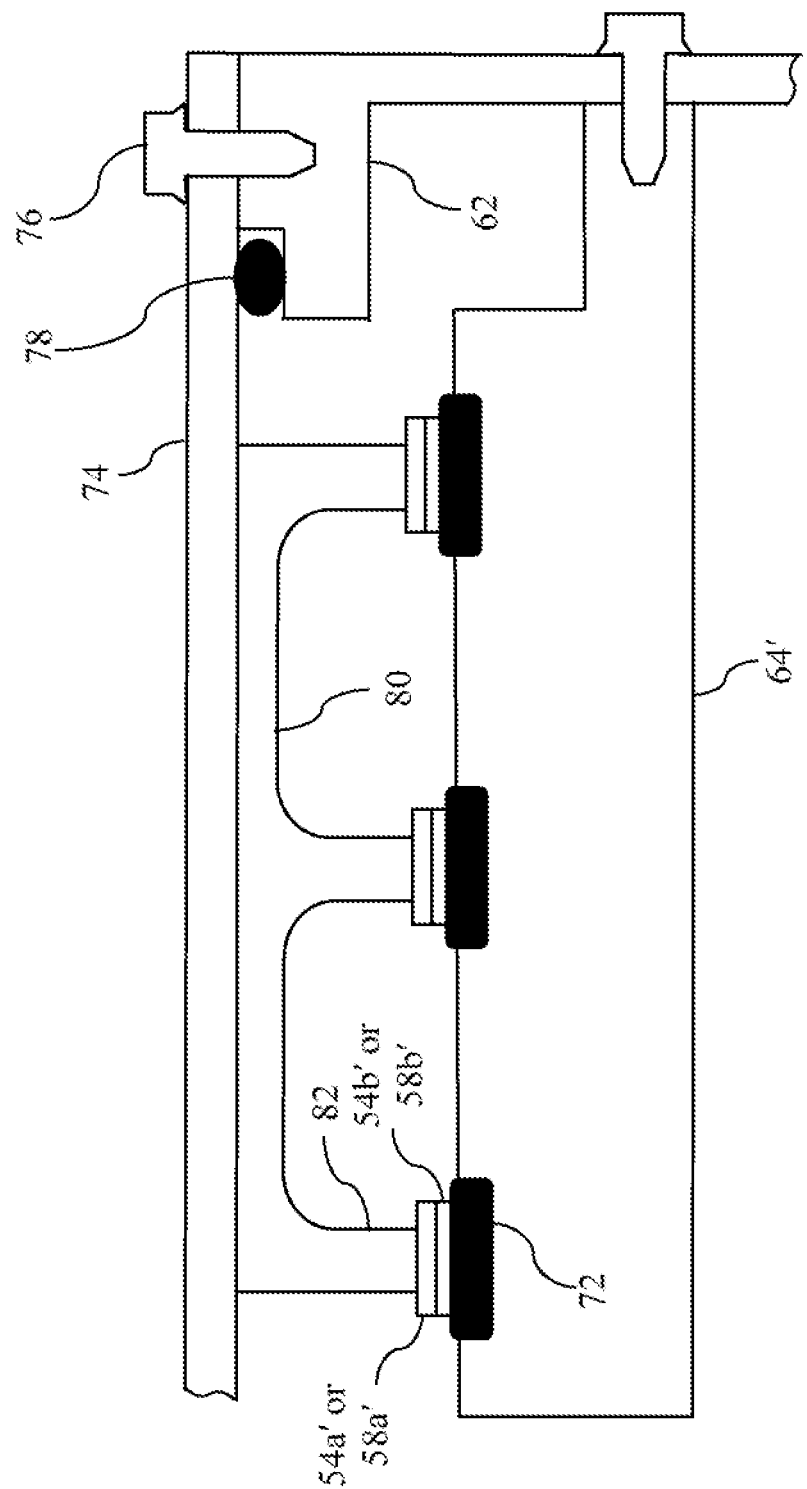
FIG. 5 is a cross sectional view of a second terminal block joining three inverter cables to three respective motor cables using a cover with extending prongs.
Figure 6:
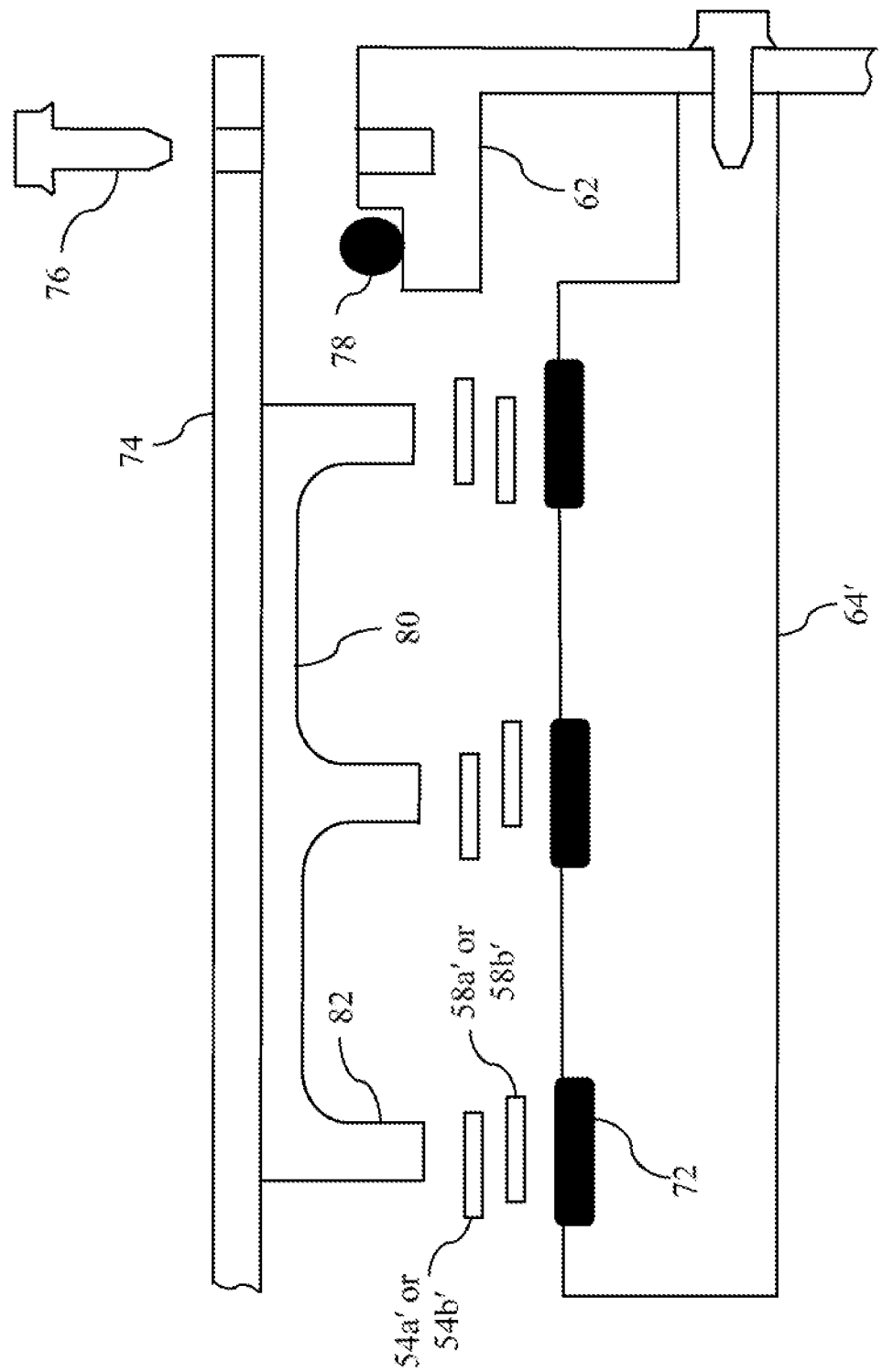
FIG. 6 is an exploded view indicating common positions of parts before installation of the cover in the terminal block of FIG. 5.

FIG. 5 illustrates an alternate terminal system designed to mitigate the problems associated with the system of FIGS. 2-4. Terminal base 64' is secured to inverter housing 62. Terminal base 64' includes a plurality of compressible limiters 72. Cover 74 is bolted to inverter housing 62 using a plurality of bolts 76 around the perimeter of the cover. The cover 74 may be sealed to the housing 62 by a compressible seal 78. The cover 74 includes a non-conductive stiffener 80 with a series of prongs 82. The stiffener may be attached to the remainder of the cover by various methods such as bolts or adhesive or may be integrally formed. Each pair of leads is squeezed between one of the prongs 82 and one of the compressible limiters 72. The limiters are designed such that the squeezing force is between a minimum required force and a maximum acceptable force for all combinations of part dimensions within specified dimension tolerances. FIG. 6 is an exploded view showing the various parts prior to attachment of the cover 74. Note that, even with the leads horizontally displaced from their nominal positions, they do not constrain installation of the cover 74.

Figure 7:
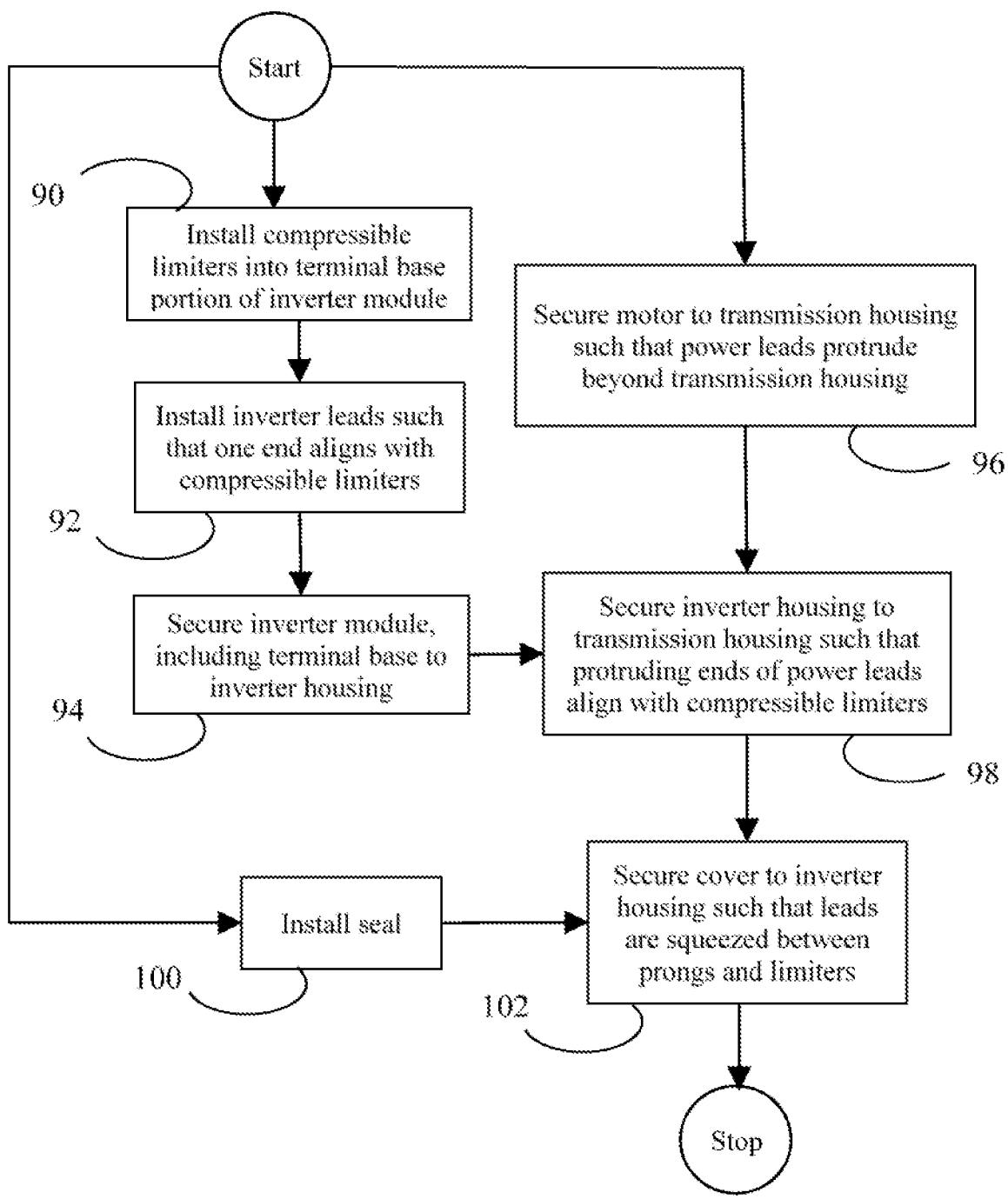
FIG. 7 is a flow chart for making electrical connections between an inverter and a motor using the terminal block of FIGS. 5-6.

FIG. 7 is a flow chart for a method of assembling an electrified transmission as show in FIGS. 5-6. At 90, a plurality of compressible limiters are installed into the terminal base which, for purposes of this flow chart, is assumed to be a portion of the inverter module. At 92, the inverter leads are installed onto the inverter module such that the free end of each lead is aligned with one of the compressible limiters. As indicated by FIG. 6, perfect alignment is not necessary. At 94, the inverter module, including the terminal base and the inverter leads, is secured to the inverter housing. At 96, the motor is installed in the transmission housing and the power leads are installed such that a free end of each lead protrudes from the transmission housing. At 98, the inverter housing is secured to the transmission housing such that the protruding ends of the power leads align with the compressible limiters. It is not important whether the inverter leads are closer to the compressible limiters or the power leads are closer to the compressible limiters. At 100, a seal is installed. The seal may be installed to either the cover or the housing such that it is between the two parts once the cover is in place. Finally, at 102, the cover is secured to the inverter housing such that the leads are squeezed between the limiters and prongs affixed to the cover.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electrified transmission comprising:
a terminal base fixed to a housing;
a first electrical lead having a first terminal plate;
a second electrical lead having a second terminal plate; and
a cover having a first prong, the cover bolted to the housing such that the first and second terminal plates are squeezed between the first prong and the terminal base to establish an electrical connection between the first and second leads.

2. The electrified transmission of claim 1 further comprising:
a third electrical lead having a third terminal plate;
a fourth electrical lead having a fourth terminal plate;
a fifth electrical lead having a fifth terminal plate; and
a sixth electrical lead having a sixth terminal plate, wherein
the third and fourth terminal plates are squeezed between a second prong of the cover and the terminal base, and the fifth and sixth terminal plates are squeezed between a third prong of the cover and the terminal base.

3. The electrified transmission of claim 2 wherein the terminal base comprises three compressible limiters configured to maintain squeeze forces on the terminal plates in the presence of slight variations in location of the terminal block with respect to the housing.

4. The electrified transmission of claim 2 further comprising:
an inverter configured to supply alternating current electrical power to the first, third, and fifth leads; and
an electric motor configured to generate torque in response to electrical power from the second, fourth, and sixth leads.

5. The electrified transmission of claim 4 wherein the terminal base and the inverter are integrated into an inverter module.

6. The electrified transmission of claim 4 further comprising:
a simple planetary gear set having a sun gear fixedly coupled to the electric motor, a ring gear drivably connected to a transmission output, and a carrier fixedly coupled to a transmission input.

7. The electrified transmission of claim 4 wherein the electric motor is drivably connected to a transmission output.

8. An electrified vehicle transmission comprising:
an inverter configured to supply electrical power to three inverter leads, each of the inverter leads terminated by a first terminal plate;
an electric machine configured to generate torque in response to electrical power from three motor leads, each of the motor leads terminated by a second terminal plate; and
a cover bolted to a housing, the cover having three prongs wherein one of the first terminal plates and one of the second terminal plates are squeezed between each prong respectively and a terminal base to establish an electrical connection between corresponding inverter leads and motor leads.

9. The electrified vehicle transmission of claim 8 further comprising:
a simple planetary gear set having a sun gear fixedly coupled to the electric machine, a ring gear drivably connected to a transmission output, and a carrier fixedly coupled to a transmission input.

10. The electrified vehicle transmission of claim 8 wherein the electric machine is drivably connected to a transmission output.

11. A method of assembling a transmission comprising:
securing a motor to a transmission housing such that three power leads protrude beyond the transmission housing;
securing an inverter housing to the transmission housing, the inverter housing containing an inverter module having three inverter leads and a terminal base; and
securing a cover to the inverter housing such that respective pairs of the inverter leads and power leads are squeezed between the cover and the terminal base.

12. The method of claim 11 wherein the terminal base includes three compressible limiters aligned with the pairs of leads.

13. The method of claim 12 wherein the cover defines three non-conductive prongs aligned with the compressible limiters and the pairs of leads.

14. The method of claim 11 further comprising installing a seal between the inverter housing and the cover before attaching the cover to the inverter housing.

\* \* \* \* \*